US011416133B2

(12) United States Patent
Karino et al.

(10) Patent No.: US 11,416,133 B2
(45) Date of Patent: Aug. 16, 2022

(54) DEVICE WITH TOUCH PANEL DISPLAY, CONTROL METHOD OF DEVICE WITH TOUCH PANEL DISPLAY, AND PROGRAM

(71) Applicant: FUJIFILM Corporation, Tokyo (JP)

(72) Inventors: Takatoshi Karino, Kanagawa (JP); Kazuyuki Itagaki, Kanagawa (JP); Makoto Ozeki, Tokyo (JP); Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/203,046

(22) Filed: Mar. 16, 2021

(65) Prior Publication Data

US 2021/0200428 A1   Jul. 1, 2021

Related U.S. Application Data

(63) Continuation of application No. PCT/JP2019/035057, filed on Sep. 5, 2019.

(30) Foreign Application Priority Data

Sep. 19, 2018   (JP) .............................. JP2018-175097

(51) Int. Cl.
*G06F 3/04845* (2022.01)
*G06F 3/041* (2006.01)
(Continued)

(52) U.S. Cl.
CPC ........ *G06F 3/04845* (2013.01); *G06F 3/0412* (2013.01); *G06F 3/0488* (2013.01);
(Continued)

(58) Field of Classification Search
CPC ............... G06F 3/04845; G06F 3/0412; G06F 3/04842; G06F 2203/04105
See application file for complete search history.

(56) References Cited

U.S. PATENT DOCUMENTS

| 9,575,641 B2 | 2/2017 | Shechtman et al. |
| 2010/0090971 A1* | 4/2010 | Choi ..................... G06F 3/0482 345/173 |

(Continued)

FOREIGN PATENT DOCUMENTS

| JP | 2010-140300 A | 6/2010 |
| JP | 2012-505466 A | 3/2012 |

(Continued)

OTHER PUBLICATIONS

International Search Report issued in PCT/JP2019/035057; dated Nov. 12, 2019.

(Continued)

*Primary Examiner* — Priyank J Shah
(74) *Attorney, Agent, or Firm* — Studebaker & Brackett PC

(57) ABSTRACT

There are provided a device with a touch panel display, a control method of a device with a touch panel display, and a program capable of performing desired processing on an object in an image by a simple operation. An object region occupied by an object including at least a portion of a contact region on an image is determined based on a contact region by a pinch-in operation, and in a case where a transition from the pinch-in operation to an operation other than the pinch-in operation is recognized, an action related to the object region on the image displayed on the touch panel display is performed.

14 Claims, 17 Drawing Sheets

(51) Int. Cl.
G06F 3/04842 (2022.01)
G06F 3/0488 (2022.01)

(52) U.S. Cl.
CPC ...... G06F 3/04146 (2019.05); G06F 3/04842 (2013.01); *G06F 2203/04105* (2013.01)

(56) References Cited

U.S. PATENT DOCUMENTS

| | | | |
|---|---|---|---|
| 2013/0254688 A1* | 9/2013 | Shechtman | G06F 3/04842 715/764 |
| 2019/0228589 A1* | 7/2019 | Dascola | G06F 3/0482 |

FOREIGN PATENT DOCUMENTS

| | | | |
|---|---|---|---|
| JP | 2014-134867 A | 7/2014 |
| JP | 5731979 B2 | 6/2015 |
| JP | 2016-001509 A | 1/2016 |

OTHER PUBLICATIONS

International Preliminary Report on Patentability and Written Opinion issued in PCT/JP2019/035057; dated Mar. 23, 2021.
Paint 3D (Microsoft Corporation) Magic Select <URL: https://www.microsoft.com/ja-jp/p/%E3%83%9A%E3%82%A4%E3%83%B3%E3%83%88-3d/9nblg gh5fv99?activetab=pivot%3aoverviewtab>.
An Office Action; "Notice of Reasons for Refusal", mailed by the Japanese Patent Office dated May 10, 2022, which corresponds to Japanese Patent Application No. 2020-548321 and is related to U.S. Appl. No. 17/203,046 with English language translation.

\* cited by examiner

DEVICE WITH TOUCH PANEL DISPLAY, CONTROL METHOD OF DEVICE WITH TOUCH PANEL DISPLAY, AND PROGRAM

CROSS-REFERENCE TO RELATED APPLICATIONS

The present application is a Continuation of PCT International Application No. PCT/JP2019/035057 filed on Sep. 5, 2019 claiming priority under 35 U.S.C § 119(a) to Japanese Patent Application No. 2018-175097 filed on Sep. 19, 2018. Each of the above applications is hereby expressly incorporated by reference, in its entirety, into the present application.

BACKGROUND OF THE INVENTION

1. Field of the Invention

The present invention relates to a device with a touch panel display, a control method of a device with a touch panel display, and a program, and more particularly to a technique of performing desired processing on an image by an intuitive operation.

2. Description of the Related Art

In recent years, a touch panel display in which a touch panel for detecting an input according to a contact operation is provided on a display has been widely used, and is used in mobile devices such as a smartphone.

In a device with a touch panel display, a user may change an image displayed on a display by an input on a touch panel.

For example, JP5731979B discloses a technique of picking up and saving an arbitrary object corresponding to a first multi-touch input among displayed objects and calling the saved object corresponding to a second multi-touch input.

Further, U.S. Pat. No. 9,575,641B discloses a technique of correcting a position of a selected region in an image by dragging the selected region.

Further, in Magic Select in Paint 3D (Microsoft Corporation)<URL: https://www.microsoft.com/j a-jp/p/% E3%83%9A % E3%82% A4% E3%83% B3% E3%83%88-3 d/9nblggh5fv99?activetab=pivot %3aoverviewtab>, a technique of automatically determining and cutting an object region is disclosed.

SUMMARY OF THE INVENTION

In the technique described in JP5731979B, objects which can be picked up are limited to objects already recognized as objects by a system, and as a result, objects which are not recognized as objects cannot be picked up.

In addition, in the technique described in U.S. Pat. No. 9,575,641B, many steps are required for selection of a desired region by a user, and as a result, a simple operation cannot be realized.

Further, in the technique described in Magic Select in Paint 3D, designation of a rectangular range for specifying a seed point is required, and as a result, a simple operation cannot be realized.

The present invention has been made in view of such circumstances, and an object of the present invention is to provide a device with a touch panel display, a control method of a device with a touch panel display, and a program capable of performing desired processing on an object in an image by a simple operation.

In order to achieve the above object, according to an aspect of the present invention, there is provided a device with a touch panel display comprising: a touch panel display; an image display unit that causes the touch panel display to display an image; a pinch-in operation recognition unit that recognizes a pinch-in operation of a user on the touch panel display; a contact region recognition unit that recognizes a contact region in which a finger is brought into contact with the touch panel display by the pinch-in operation; an object region determination unit that determines an object region occupied by an object including at least a portion of the contact region on the image based on the contact region recognized by the contact region recognition unit; an operation transition recognition unit that recognizes a transition from the pinch-in operation to an operation other than the pinch-in operation; and an output action unit that performs an action related to the object region on the image displayed on the touch panel display in a case where the transition to the operation other than the pinch-in operation is recognized.

According to the aspect, the device with a touch panel display determines the object region occupied by the object including at least a portion of the contact region on the image based on the contact region by the pinch-in operation, and performs the action related to the object region on the image displayed on the touch panel display in a case where a transition from the pinch-in operation to an operation other than the pinch-in operation is recognized. Therefore, it is possible to perform desired processing on the object in the image by a simple operation.

In the aspect of the present invention, preferably, the operation other than the pinch-in operation is at least one of a pinch-out operation, an operation of releasing a contact with the touch panel display, a drag operation, or an operation of making a pressing force against the touch panel display stronger than the pressing force in the pinch-in operation. Therefore, it is possible to perform desired processing on the object in the image by a series of operations starting from the pinch-in operation.

In the aspect of the present invention, preferably, the action related to the object region is at least one of an action of copying or moving the object region, an action of storing the object region in a memory, an action of changing a direction of the object region, or an action of enlarging or reducing the object region. Therefore, it is possible to perform appropriate processing on the object in the image.

In the aspect of the present invention, preferably, the image is a captured image obtained by an imaging element. According to the aspect, it is possible to perform desired processing on the object in the image even in a case where the image is an image in which an object region is not extracted.

In order to achieve the above object, according to another aspect of the present invention, there is provided a control method of a device with a touch panel display, the method including: an image display step of causing the touch panel display to display an image; a pinch-in operation recognition step of recognizing a pinch-in operation of a user on the touch panel display; a contact region recognition step of recognizing a contact region in which a finger is brought into contact with the touch panel display by the pinch-in operation; an object region determination step of determining an object region occupied by an object including at least a portion of the contact region on the image based on the contact region recognized by the contact region recognition step; an operation transition recognition step of recognizing a transition from the pinch-in operation to an operation other than the pinch-in operation; and an output action step of performing an action related to the object region on the image displayed on the touch panel display in a case where the transition to the operation other than the pinch-in operation is recognized.

According to the aspect, it is possible to perform desired processing on the object in the image by a simple operation. The aspect also includes a program for causing a computer to execute the control method of a device with a touch panel display.

According to the present invention, it is possible to perform desired processing on the object in the image by a simple operation.

DESCRIPTION OF THE PREFERRED EMBODIMENTS

Hereinafter, preferred embodiments of the present invention will be described with reference to the accompanying drawings.

<Device with Touch Panel Display>

Figure 1:
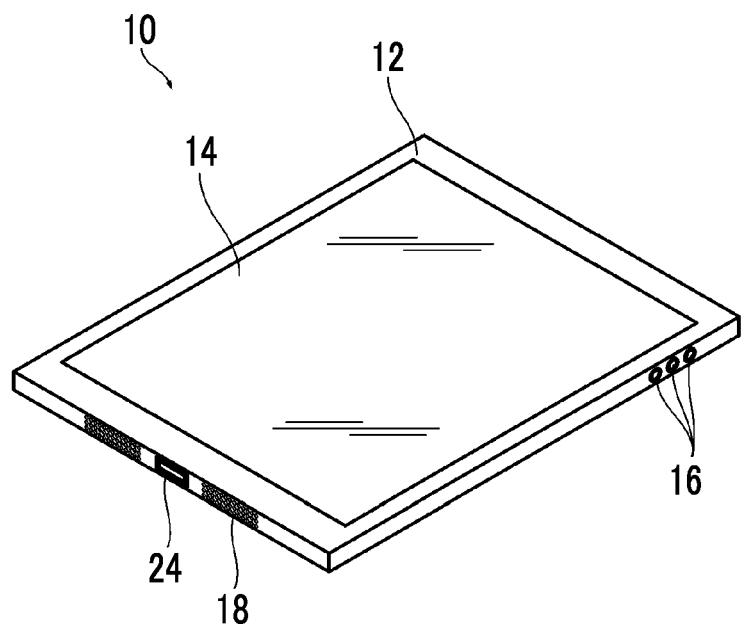
FIG. 1 is a front perspective view of a tablet PC.
Figure 2:
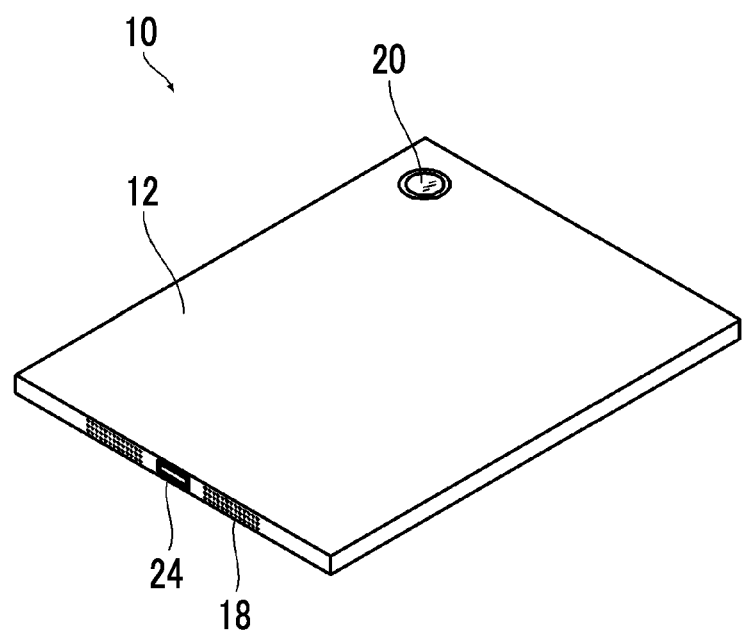
FIG. 2 is a rear perspective view of the tablet PC.

FIG. 1 is a front perspective view of a tablet computer device 10 (hereinafter, referred to as a tablet personal computer (PC) 10) that is an example of a device with a touch panel display according to the present embodiment, and FIG. 2 is a rear perspective view of the tablet PC 10. As illustrated in FIGS. 1 and 2, the tablet PC 10 includes a plate-shaped housing 12 having a rectangular outline. The housing 12 includes a touch panel display 14, operation buttons 16, a speaker 18, a built-in camera 20, and an external connection terminal 24.

Figure 3:
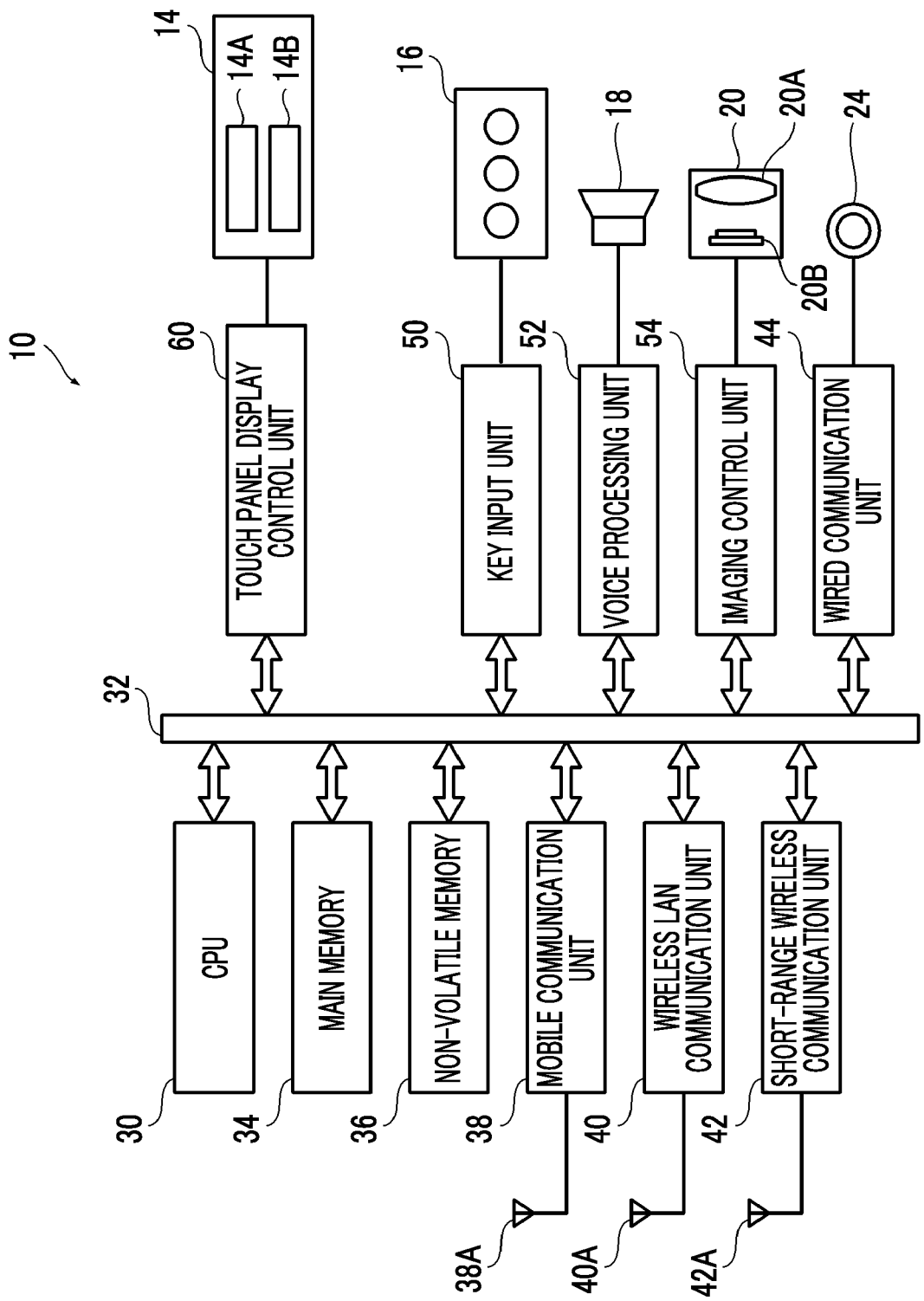
FIG. 3 is a block diagram illustrating a system configuration of the tablet PC.

FIG. 3 is a block diagram illustrating a system configuration of the tablet PC 10. As illustrated in FIG. 3, the tablet PC 10 includes a central processing unit (CPU) 30 that controls the entire operation of the tablet PC 10. A main memory 34, a non-volatile memory 36, a mobile communication unit 38, a wireless local area network (LAN) communication unit 40, a short-range wireless communication unit 42, and wired communication unit 44, a key input unit 50, a voice processing unit 52, an imaging control unit 54, and a touch panel display control unit 60 are connected to the CPU 30 via a system bus 32.

The CPU 30 reads an operating system (OS), an application program which operates on the OS, and structured data that are stored in the non-volatile memory 36, expands the OS, the application program, and the structured data in the main memory 34, and executes an operation program. Thereby, the CPU 30 functions as a control unit that controls the entire operation of the computer.

The main memory 34 is configured with, for example, a random access memory (RAM), and functions as a work memory of the CPU 30.

The non-volatile memory 36 is configured with, for example, a flash electrically-erasable-programmable read only memory (EEPROM), and stores an OS, an application program, and various structured data. Further, the non-volatile memory 36 functions as a storage unit of the tablet PC 10, and stores various data.

The mobile communication unit 38 transmits and receives data to and from a nearest wireless base station (not illustrated) via an antenna 38A by using a 4th generation (4G) mobile communication system or a 5th generation (5G) mobile communication system.

The wireless LAN communication unit 40 performs wireless LAN communication with a wireless LAN access point or an external device capable of performing wireless LAN communication via an antenna 40A according to, for example, a wireless LAN communication standard such as an Institute of Electrical and Electronics Engineers (IEEE) 802.11a/b/g/n standard.

The short-range wireless communication unit 42 performs communication with another device, for example, in a class-2 range (within a radius of approximately 10 m) via the antenna 42A according to a Bluetooth (registered trademark) standard.

The wired communication unit 44 performs communication with an external device connected by a cable (not illustrated) via the external connection terminal 24 according to a predetermined communication standard.

The key input unit 50 is configured with a driving circuit that drives a plurality of operation buttons 16.

The voice processing unit 52 converts digital voice data which is input via the system bus 32 into analog data. A voice signal obtained by the digital-to-analog conversion is reproduced and output from the speaker 18.

The imaging control unit 54 converts an analog image signal, which is output from the built-in camera 20 including an imaging lens 20A and an imaging element 20B, into a digital image signal, and performs predetermined signal processing on the digital image signal, and outputs the processed digital image signal.

The touch panel display 14 includes a display unit 14A such as a color liquid crystal display (LCD) panel that displays an image, a touch panel unit 14B such as a transparent electrode that is disposed on a front surface of the color LCD panel and receives a touch input, and a pressing force sensor 14C that detects a pressing force against the touch panel unit 14B at a contact position.

The touch panel unit 14B is made of, for example, glass or plastic, and is a capacitive type touch panel that includes a board body having a light-transmitting property, a position detection electrode which is provided on the board body in a planar shape and has a light-transmitting property, and an insulating layer provided on the position detection electrode. The touch panel unit 14B is disposed on the front surface of the display unit 14A, and generates and outputs two-dimensional position coordinate information corresponding to a touch operation of a user.

The touch panel display control unit 60 controls the touch panel display 14. The touch panel display control unit 60 associates a coordinate of the image displayed on the display unit 14A with a coordinate of the touch operation on the touch panel unit 14B.

Figure 4:
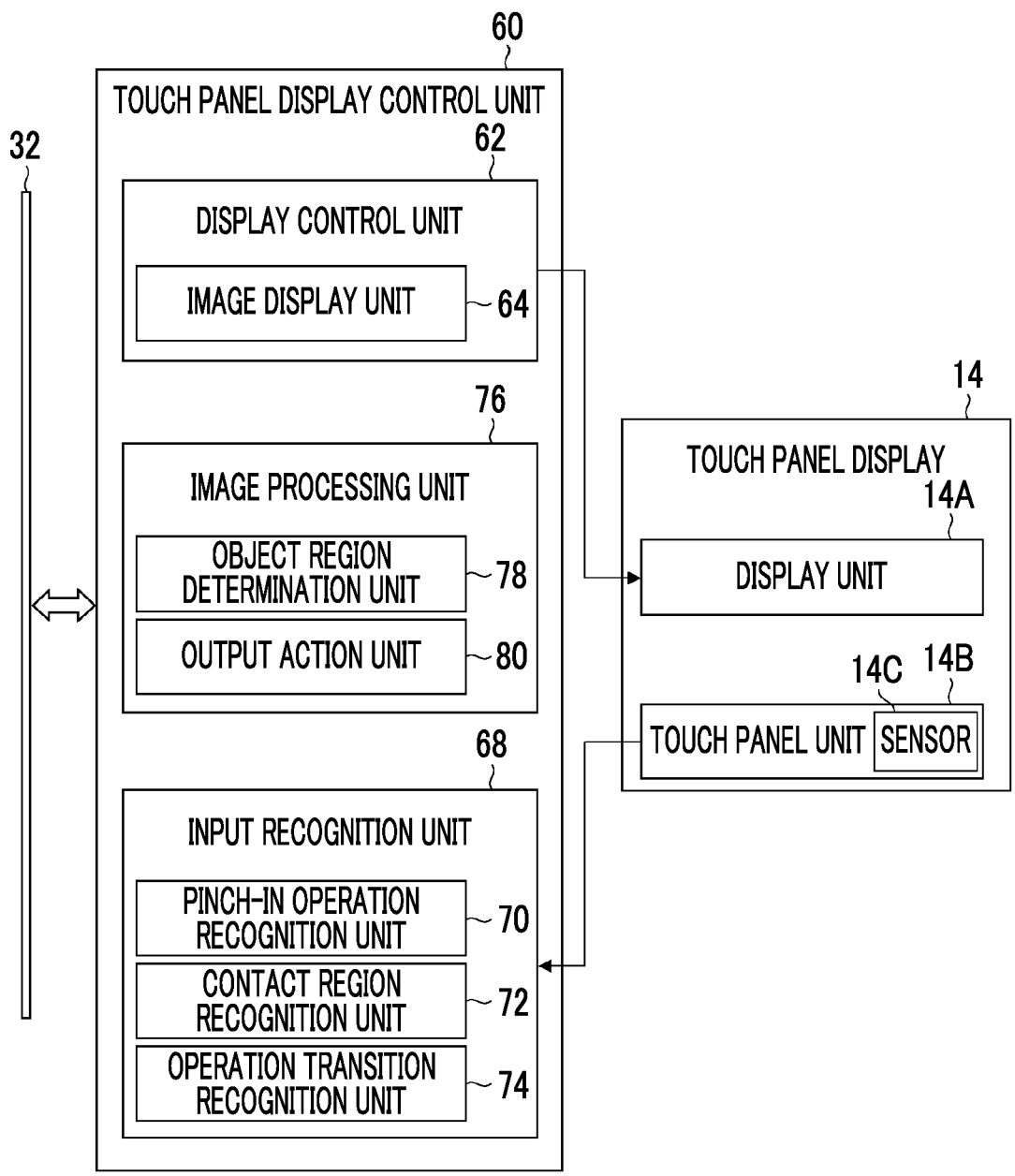
FIG. 4 is a block diagram illustrating a system configuration of a touch panel display control unit.

FIG. 4 is a block diagram illustrating a system configuration of the touch panel display control unit 60. As illustrated in FIG. 4, the touch panel display control unit 60 includes a display control unit 62, an input recognition unit 68, and an image processing unit 76.

The display control unit 62 causes the display unit 14A to display various information based on a command from the CPU 30. The display control unit 62 includes an image display unit 64.

The image display unit 64 causes the display unit 14A to display various images based on a command from the CPU 30. The image display unit 64 causes the display unit 14A to display, for example, a captured image captured by the built-in camera 20. In addition, the image display unit 64 causes the display unit 14A to display an image which is read from the non-volatile memory 36. Further, the image display unit 64 causes the display unit 14A to display an image which is acquired via the mobile communication unit 38, the wireless LAN communication unit 40, the short-range wireless communication unit 42, and the wired communication unit 44.

The input recognition unit 68 recognizes an input operation of the user by acquiring two-dimensional position coordinate information corresponding to the touch operation of the user from the touch panel unit 14B. The input recognition unit 68 includes a pinch-in operation recognition unit 70, a contact region recognition unit 72, and an operation transition recognition unit 74.

The pinch-in operation recognition unit 70 recognizes a pinch-in operation of the user on the touch panel unit 14B. The pinch-in operation is an operation of bringing, for example, fingers into contact with positions of two points of the touch panel unit 14B and then bringing the contact positions to be closer to each other so as to decrease a distance between the two points.

The contact region recognition unit 72 recognizes a contact region in which, for example, a finger is brought into contact with the touch panel unit 14B in the pinch-in operation.

Figure 5:
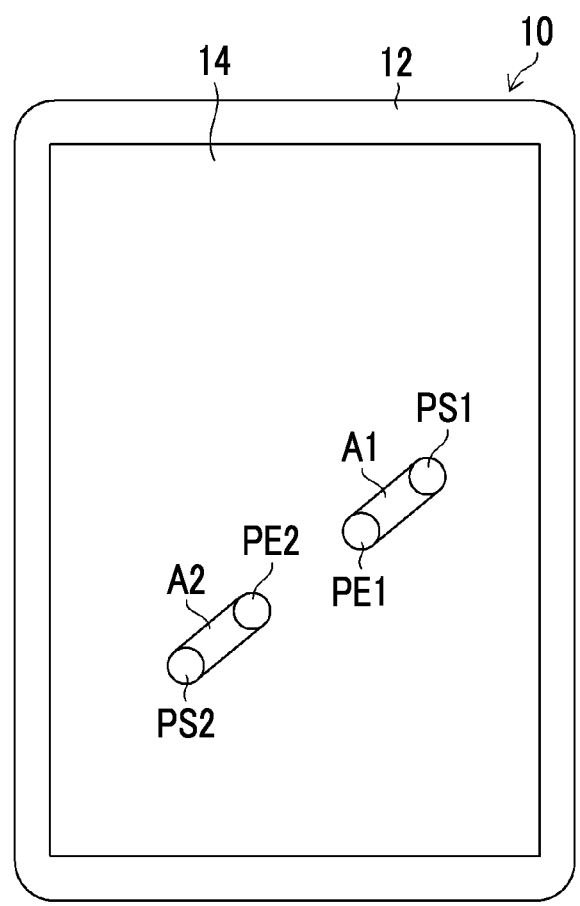
FIG. 5 is a diagram for explaining a contact region.

FIG. 5 is a diagram for explaining a contact region. In a state where a right index finger is brought into contact with a start point PS1 which is a position on the touch panel display 14 and a right thumb is brought into contact with a start point PS2 which is a position on the touch panel display 14, the pinch-in operation is performed by moving the right index finger to an end point PE1 on the touch panel display 14 and moving the right thumb to an end point PE2 on the touch panel display 14. In this case, the contact region refers to a region A1 in which the right index finger is brought into contact with the touch panel display 14 from the start point PS1 to the end point PE1 and a region A2 in which the right thumb is brought into contact with the touch panel display 14 from the start point PS2 to the end point PE2. The region A1 includes the start point PS1 and the end point PE1, and the region A2 includes the start point PS2 and the end point PE2. As described above, the contact region refers to a region in which a finger is brought into contact with the touch panel display 14 in the pinch-in operation.

Returning to the description of FIG. 4, the operation transition recognition unit 74 recognizes that the pinch-in operation transitions to an operation other than the pinch-in operation. The operation other than the pinch-in operation is, for example, a pinch-out operation, a drag operation, a rotation operation, a non-contact operation, or the like.

The pinch-out operation is an operation of bringing, for example, fingers into contact with positions of two points of the touch panel unit 14B and then bringing the contact positions to be farther from each other so as to increase a distance between the two points. The drag operation is an operation of moving the contact position of the touch panel unit 14B. Here, the drag operation includes an operation of moving the contact position while keeping the distance between the two points constant from a state where the pinch-in operation is performed (pinch-in state).

The rotation operation is an operation of rotating a relative position relationship between the two contact positions by rotating (twisting) fingers from the pinch-in state. The non-contact operation is an operation of bringing the finger contacted with the touch panel unit 14B into a non-contact state.

Further, the operation other than the pinch-in operation may be a pressing operation of pressing the touch panel unit 14B with a pressing force relatively larger than the pressing force in the pinch-in operation.

The image processing unit 76 performs processing on the input image. The image processing unit 76 includes an object region determination unit 78 and an output action unit 80.

The object region determination unit 78 determines an object region occupied by an object including at least a portion of the contact region on the image displayed on the display unit 14A based on the contact region recognized by the contact region recognition unit 72.

The output action unit 80 performs an action related to the object region on the image displayed on the display unit 14A in a case where the pinch-in operation transitions to an operation other than the pinch-in operation.

In the following description, a display on the display unit 14A and a touch operation on the touch panel unit 14B will be simply referred to as a display on the touch panel display 14 and an operation on the touch panel display 14.

<Control method of Device with Touch Panel Display>

Figure 6:
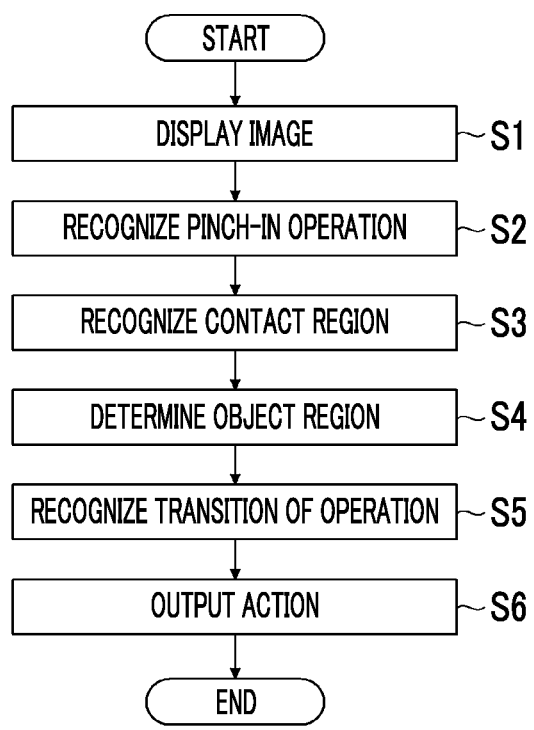
FIG. 6 is a flowchart illustrating a control method of the tablet PC.

The tablet PC 10 can perform desired processing on an object in an image according to an operation of the user. FIG. 6 is a flowchart illustrating a control method of the tablet PC 10. As illustrated in FIG. 6, the control method of the tablet PC 10 includes an image display step (step S1), a pinch-in operation recognition step (step S2), a contact region recognition step (step S3), an object region determination step (step S4), an operation transition recognition step (step S5), and an output action step (step S6).

In step S1, the image display unit 64 causes the touch panel display 14 to display an image. In a case where the user performs a touch operation on the touch panel display 14, a desired image can be displayed on the touch panel display 14. In the present embodiment, the image display unit 64 displays, for example, an image which is read from the non-volatile memory 36. Here, the displayed image is a captured image captured by using an imaging element, an image which is not created by a computer, or an image which is not segmented.

In step S2, the pinch-in operation recognition unit 70 recognizes a pinch-in operation of the user on the touch panel display 14. The user performs a pinch-in operation on an object included in the image displayed on the touch panel display 14 such that at least a portion of the object for performing desired processing becomes a contact region. In a case where the pinch-in operation recognition unit 70 recognizes the pinch-in operation, the processing proceeds to step S3.

In step S3, the contact region recognition unit 72 recognizes a contact region in which the finger is brought into contact with the touch panel display 14 by the pinch-in operation.

In step S4, the object region determination unit 78 determines an object region selected by the user. Specifically, the object region determination unit 78 determines an object region occupied by an object including at least a portion of the contact region on the image displayed on the touch panel display 14 based on the contact region recognized in step S3.

For this purpose, the object region determination unit 78 first extracts a plurality of object regions from the image by performing segmentation processing on the image displayed on the touch panel display 14. As the region extraction processing, binarization (multi-level processing) based on a pixel value distribution, a graph cut algorithm of segmenting pixels from connection between adjacent pixels, a region growing method of extracting a region while expanding a region of pixels satisfying a condition, a region extraction method using a convolutional neural network, or the like may be used. On the other hand, the present invention is not limited thereto, and other known methods may be used.

Next, the object region determination unit 78 searches for an object region including at least a portion of the contact region by comparing the position coordinate information of the contact region with position coordinate information of the plurality of object regions.

The object region determination unit 78 may search for an object region including at least a portion of the contact region by performing region extraction processing by a graph cut algorithm or a region growing method using the contact region as a seed point (a foreground seed or a foreground label).

In a case where there is only one object region including at least a portion of the contact region, the object region determination unit 78 determines the object region as an object region selected by the user. In a case where there are a plurality of object regions including at least a portion of the contact regions, the object region including the largest contact region may be determined as an object region selected by the user, or the object region including both of the two contact regions (the region A1 and the region A2 illustrated in FIG. 5) may be determined as an object region selected by the user.

In step S5, the operation transition recognition unit 74 recognizes that the pinch-in operation transitions to an operation other than the pinch-in operation. The user can perform desired processing on the selected object by the transition of the touch operation on the touch panel display 14 from the pinch-in operation to an operation other than the pinch-in operation. In a case where the operation transition recognition unit 74 recognizes that the operation transitions to an operation other than the pinch-in operation, the processing proceeds to step S6.

In step S6, the output action unit 80 performs an action assigned to the operation other than the pinch-in operation transitioned in step S5, the action being an action related to the object region determined in step S4 on the image displayed on the touch panel display 14.

As described above, according to the present embodiment, it is possible to perform a desired action related to an object region for an object in an image by a simple operation of the user. In the following, details of "the operation other than the pinch-in operation" and "the action related to the object region" will be described.

[Copy or Movement in Same Image]

Figure 7:
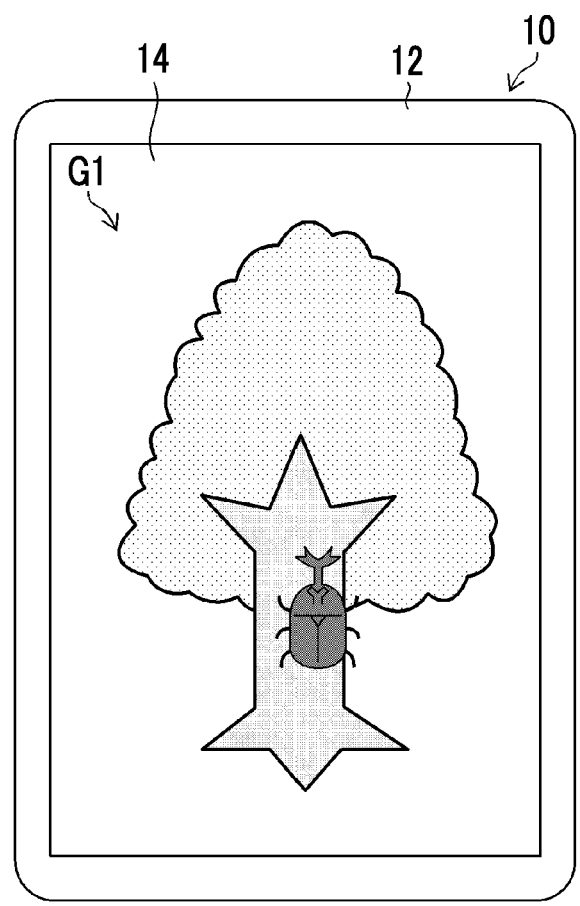
FIG. 7 is a diagram illustrating an example in which an image is displayed on a touch panel display.

FIG. 7 is a diagram illustrating an example in which an image G1 is displayed on the touch panel display 14. The image G1 is a captured image including an insect and a tree. The image G1 is an image in which segmentation of the image is not performed.

Figure 8:
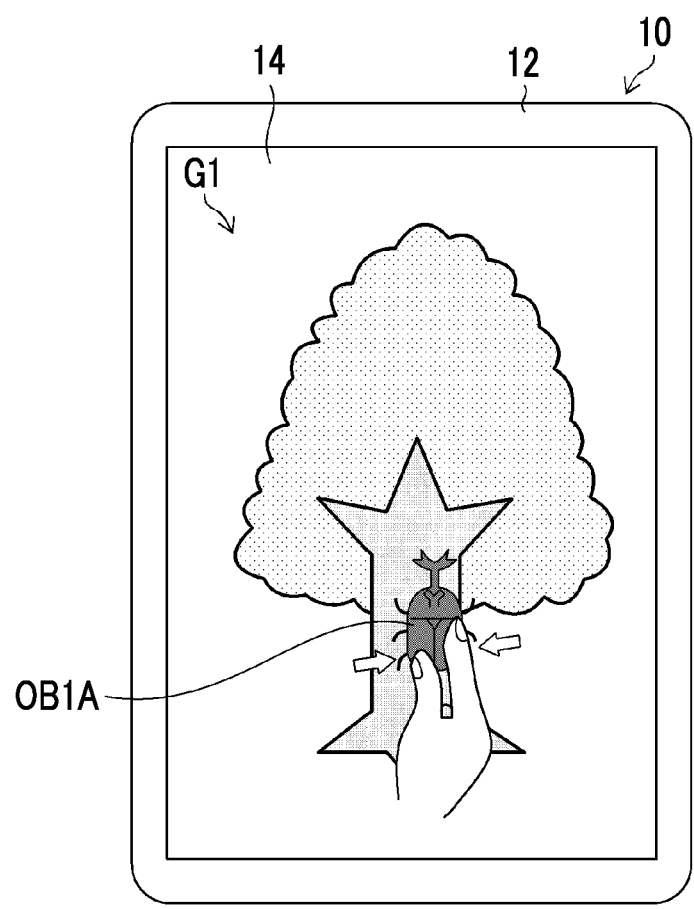
FIG. 8 is a diagram for explaining a pinch-in operation on the touch panel display.

FIG. 8 is a diagram for explaining the pinch-in operation on the touch panel display 14. As illustrated in FIG. 8, the pinch-in operation is performed using, for example, two fingers. In the example illustrated in FIG. 8, the user performs the pinch-in operation in the vicinity of an insect region of the image G1. More specifically, the user performs the pinch-in operation such that at least a portion of the insect becomes a contact region.

In response to the pinch-in operation, the object region determination unit 78 extracts an insect object region and a tree object region from the image G1 by performing segmentation processing on the image G1. Further, the object region determination unit 78 determines an object region occupied by an object including at least a portion of the contact region from the insect object region and the tree object region. In the example, the object region determination unit 78 determines an insect object region OB1A.

Figure 9:
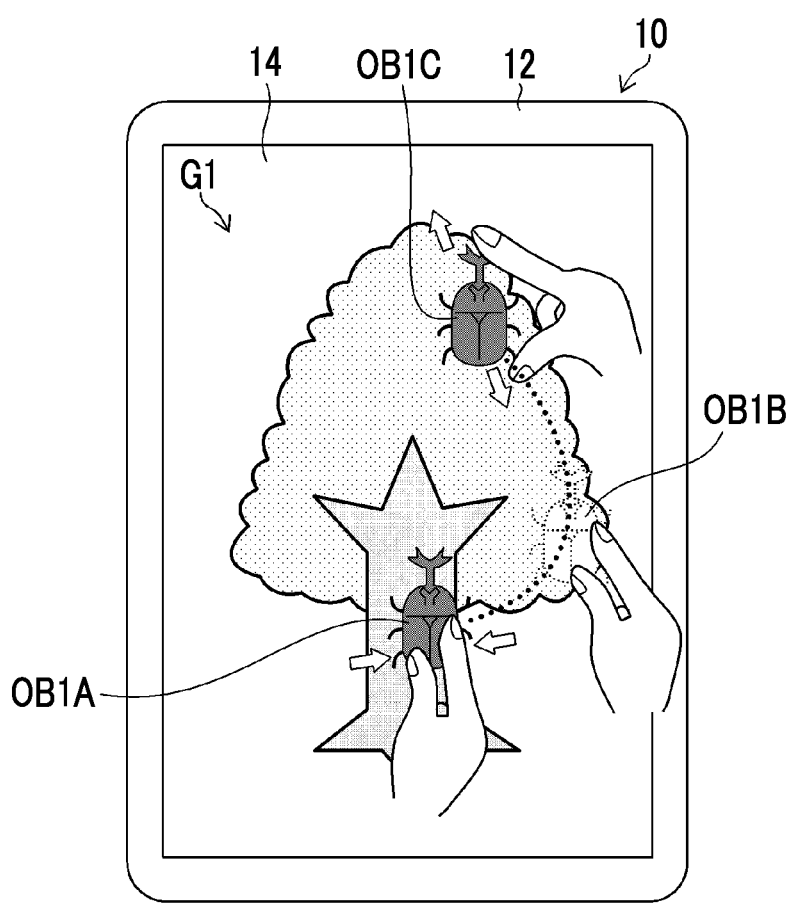
FIG. 9 is a diagram for explaining a transition from a pinch-in operation to an operation other than the pinch-in operation and an action related to an object region.

FIG. 9 is a diagram for explaining a transition from a pinch-in operation to an operation other than the pinch-in operation and an action related to the object region. In the example illustrated in FIG. 9, the user makes the fingers transition from a pinch-in operation to a drag operation while keeping the fingers in the pinch-in state.

As an output action according to the transition to the drag operation, the output action unit 80 displays an object region OB1B, which is a copy region of the insect object region OB1A and is a color-transmitting copy region, at the finger contact position of the touch panel display 14.

Further, in the example illustrated in FIG. 9, the user makes the fingers transition from the drag operation to a pinch-out operation at a position at which the insect is to be copied.

As an output action according to the transition to the pinch-out operation, the output action unit 80 displays an object region OB1C, which is a copy region of the insect object region OB1A, at a position at which the pinch-out operation is performed. The position at which the pinch-out operation is performed is, for example, a center position of two contact positions of starting points of the pinch-out operation. Further, the position at which the pinch-out operation is performed may be a center position of two contact positions of end points of the pinch-out operation.

Figure 10:
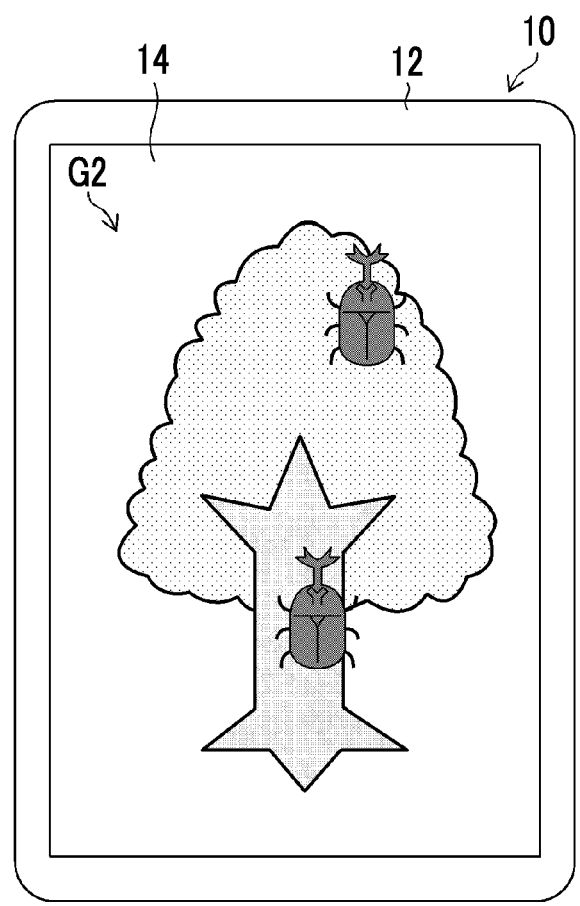
FIG. 10 is a diagram illustrating an image displayed on the touch panel display at a timing when a series of operations is completed.

FIG. 10 is a diagram illustrating an image G2 displayed on the touch panel display 14 at a timing when a series of operations is completed. The image G2 is an image in which the insect is copied and added as compared with the image G1 illustrated in FIG. 7.

As described above, according to the present embodiment, it is possible to copy an object in an image to a different position in the same image by a simple operation of the user. That is, in a case where the user performs a pinch-in operation of bringing the fingers into contact with at least a portion of an object to be copied, a desired object region can be extracted. In addition, in a case where the user performs a pinch-in operation and then sequentially performs a drag operation and a pinch-out operation, it is possible to copy an object to a desired position in the same image.

In the related art, extraction of an object region requires many steps, and as a result, user's complicated operations are required. For example, in Paint 3D software, at least three independent operations, that is, a setting operation of a seed point by the user, a start operation for determination of an object region by the user, and a selection operation of the determined object region by the user, are required. On the other hand, in the present embodiment, in a pinch-in operation, the above-mentioned three operations in the related art can be replaced with one operation, and thus the user can intuitively recognize required operations.

As described above, in the present embodiment, without making the user perform extra actions such as releasing the finger from the touch panel display and operating a button, the user can copy an object by an intuitive operation even in an image in which an object region is not extracted yet.

In the present embodiment, the example in which the object in the image is copied to a different position in the same image has been described. On the other hand, the object in the image may be moved to a different position in the same image. In this case, the original position of the moved object region may be interpolated using adjacent pixel values.

[Copy or Movement Between Different Images]

An object in an image can also be copied or moved to a different image.

Figure 11:
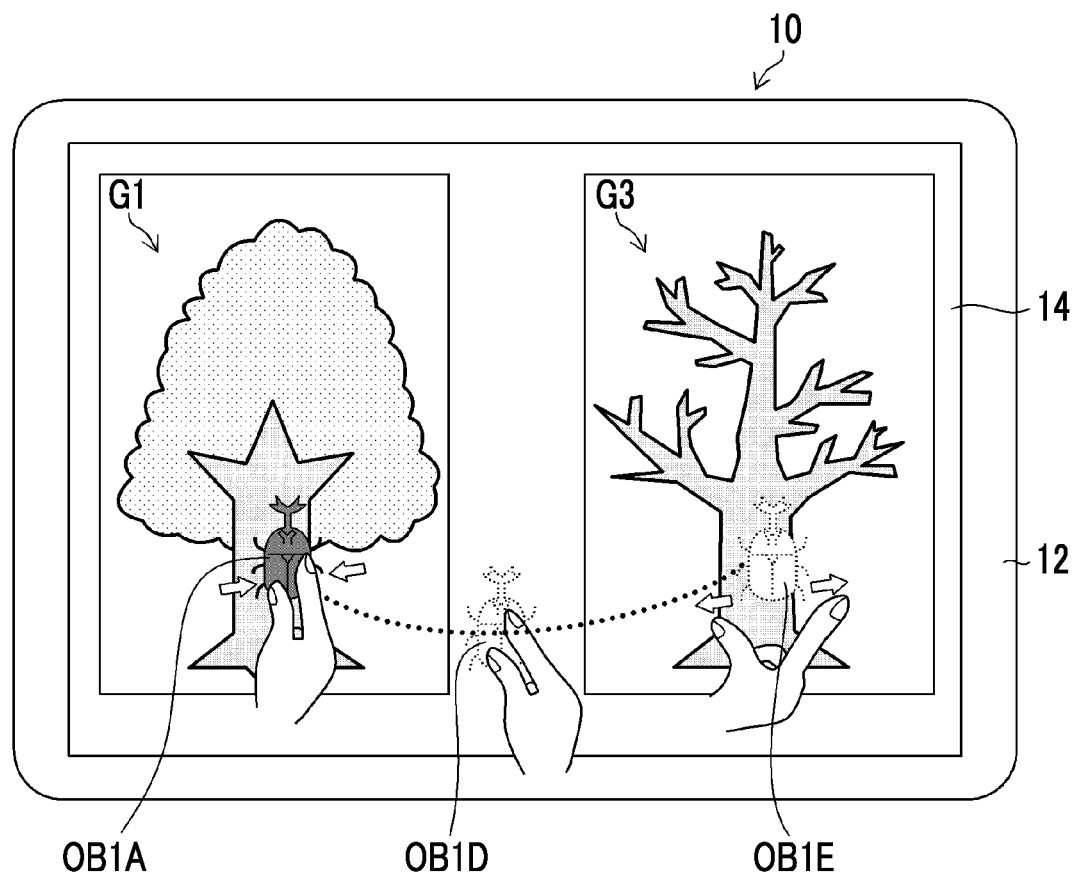
FIG. 11 is a diagram for explaining copy of an object between different images.

FIG. 11 is a diagram for explaining copy of an object between different images. In the example illustrated in FIG. 11, the image display unit 64 causes the touch panel display 14 to display an image G1 and an image G3 side by side. The image G1 is a captured image including an insect and a tree, and the image G3 is an image including a tree.

As illustrated in FIG. 11, in a case where the user performs a pinch-in operation, as in the case of copy in the same image, the object region determination unit 78 determines an insect object region OB1A as an object region occupied by an object including at least a portion of the contact region.

Further, as illustrated in FIG. 11, in a case where the user makes the fingers transition from the pinch-in operation to a drag operation, as an output action according to the transition to the drag operation, the output action unit 80 displays an object region OB1D, which is a copy region of the insect object region OB1A and is a color-transmitting copy region, at the finger contact position of the touch panel display 14.

Here, the drag operation is performed from a position at which the image G1 is displayed to a position at which the image G3 is displayed. Further, as illustrated in FIG. 11, the user makes the fingers transition to a pinch-out operation at a position in the image G3 at which the insect object region is to be copied.

As an output action according to the transition to the pinch-out operation, the output action unit 80 displays an object region OB1E, which is a copy region of the insect object region OB1A, at a position at which the pinch-out operation is performed.

Figure 12:
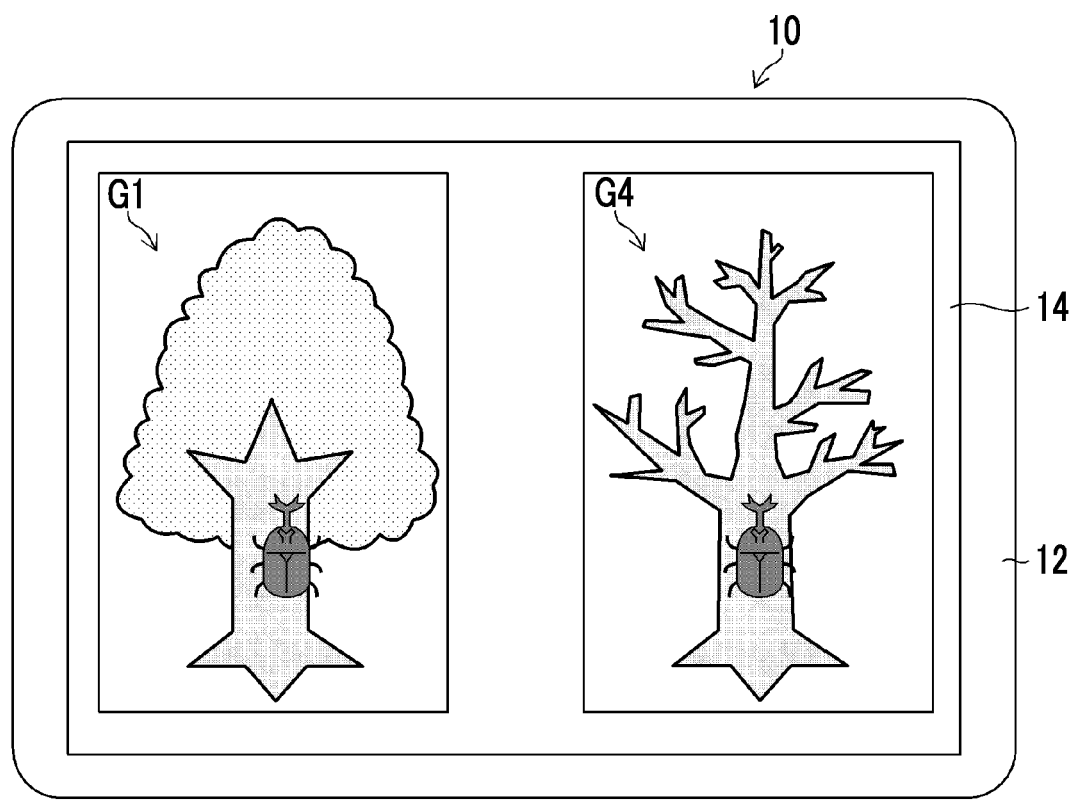
FIG. 12 is a diagram illustrating an image displayed on the touch panel display at a timing when a series of operations is completed.

FIG. 12 is a diagram illustrating a display on the touch panel display 14 at a timing when a series of operations is completed. As illustrated in FIG. 12, an image G1 and an image G4 are displayed side by side on the touch panel display 14. The image G4 is an image in which the insect is copied and added as compared with the image G3 illustrated in FIG. 11.

As described above, it is possible to copy an object in an image to a desired position in a different image by a simple operation of the user. An object may be moved instead of being copied.

In the present embodiment, the example in which the insect object region of the image G1 is copied has been described. On the other hand, a tree object region may be selected by a pinch-in operation and the tree object region may be copied or moved.

Figure 13:
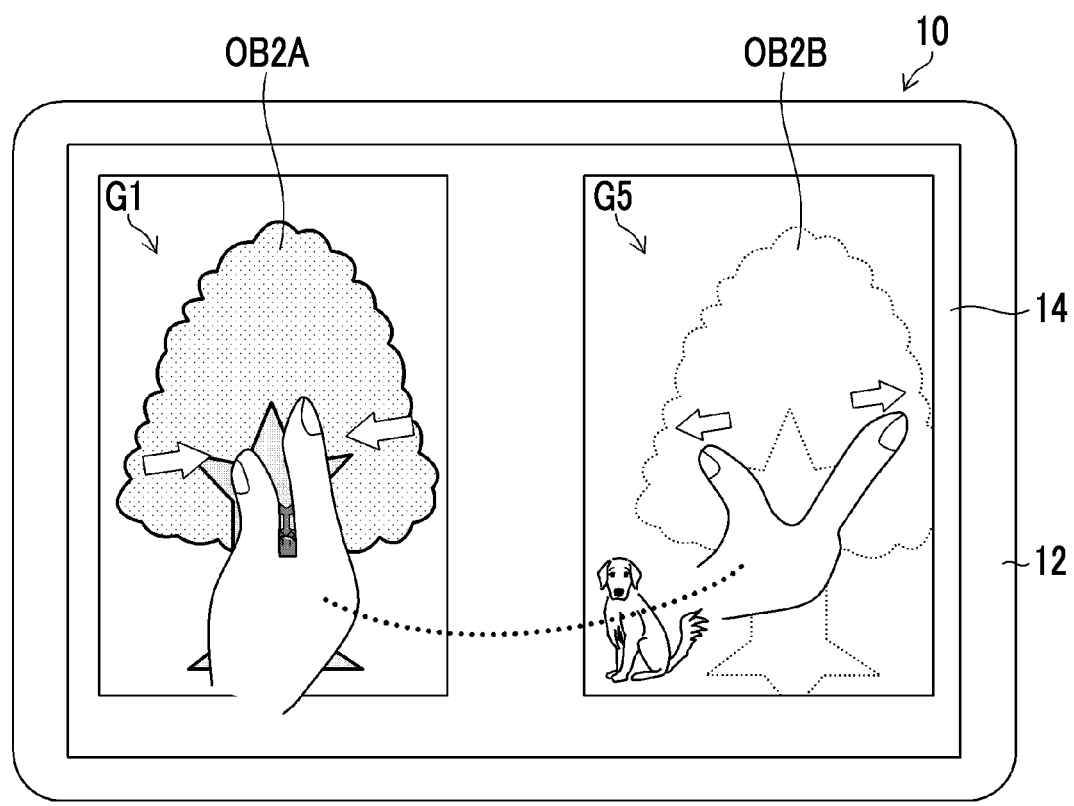
FIG. 13 is a diagram for explaining copy of an object.

FIG. 13 is a diagram for explaining copy of an object different from the object in the case illustrated in FIG. 11. In the example illustrated in FIG. 13, the image display unit 64 causes the touch panel display 14 to display an image G1 and an image G5 side by side. The image G1 is a captured image including an insect and a tree, and the image G5 is an image including an animal.

As illustrated in FIG. 13, first, the user performs a pinch-in operation. In the example illustrated in FIG. 13, the user performs the pinch-in operation in the vicinity of a tree region of the image G1. More specifically, the user performs the pinch-in operation such that at least a portion of the tree becomes a contact region.

The object region determination unit 78 determines a tree object region OB2A as an object region occupied by an object including at least a portion of the contact region.

In addition, as illustrated in FIG. 13, the user makes the fingers transition from the pinch-in operation to a drag operation. As an output action according to the transition to the drag operation, the output action unit 80 may display a color-transmitting copy region, which is a copy region of the tree object region OB2A, at the finger contact position of the touch panel display 14.

Further, the user makes the fingers transition to a pinch-out operation at a position in the image G5 at which the tree object region is to be copied. As an output action according to the transition to the drag operation and the pinch-out operation, the output action unit 80 displays an object region OB2B, which is a copy region of the tree object region OB2A, at a position at which the pinch-out operation is performed.

Figure 14:
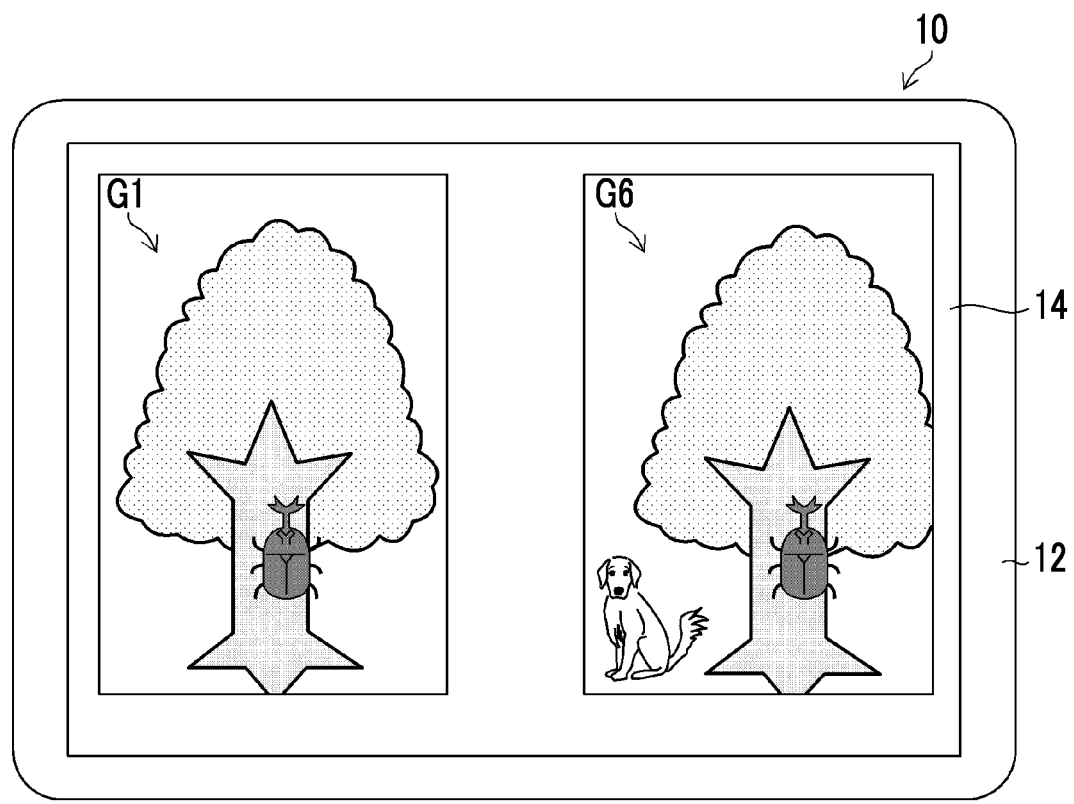
FIG. 14 is a diagram illustrating an image displayed on the touch panel display at a timing when a series of operations is completed.

FIG. 14 is a diagram illustrating a display on the touch panel display 14 at a timing when a series of operations is completed. As illustrated in FIG. 14, an image G1 and an image G6 are displayed side by side on the touch panel display 14. The image G6 is an image in which the tree is copied and added as compared with the image G5 illustrated in FIG. 13.

In the example, the tree is copied together with the insect. On the other hand, the insect object and the tree object may be separated from each other, and only the tree object may be copied.

In this way, the user can select a desired object region from a plurality of objects included in the image by changing the contact region in the pinch-in operation.

The example is not limited to copy or move between different images. For example, the tree object region may be copied or moved in the same image.

[Rotation]

Figure 15:
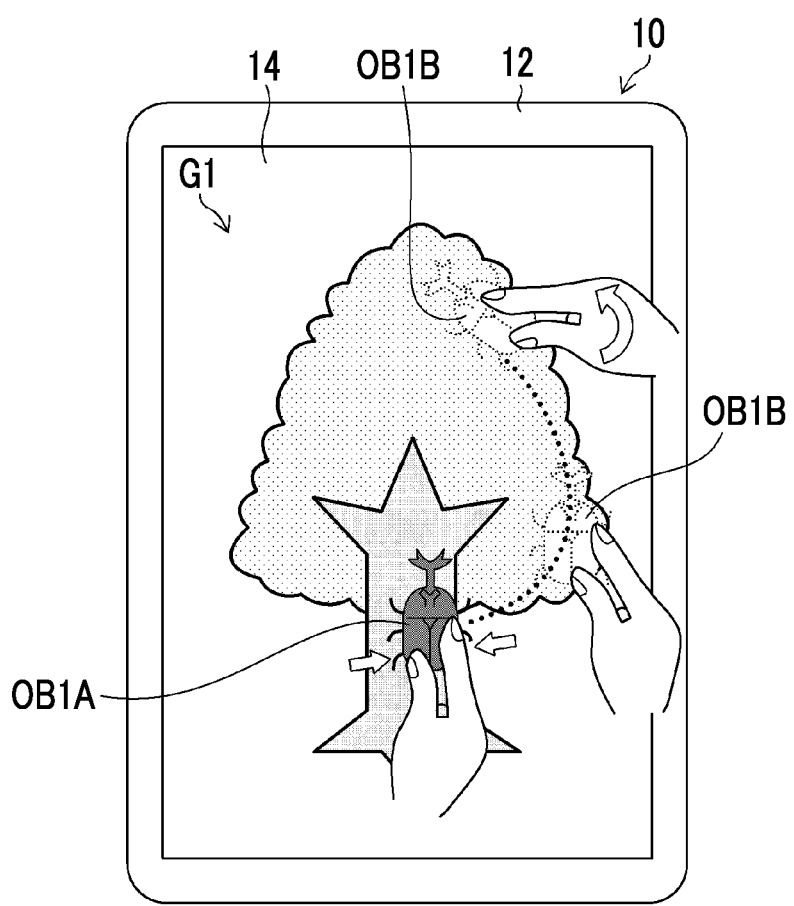
FIG. 15 is a diagram for explaining rotation of an object.

The tablet PC 10 can change a direction of a desired object. FIG. 15 is a diagram for explaining rotation of an object.

In a case where the user performs a pinch-in operation on the image G1 illustrated in FIG. 7 and then makes the fingers transition from the pinch-in operation to a drag operation, as illustrated in FIG. 15, as an output action according to the transition to the drag operation, the output action unit 80 displays an object region OB1B, which is a copy region of the extracted object region OB1A and is a color-transmitting copy region, at the finger contact position of the touch panel display 14.

Thereafter, the user makes the fingers transition from the pinch-in state to a rotation operation. As an output action according to the transition to the rotation operation, the output action unit 80 changes and displays a direction of the object region OB1B according to a rotation amount of a relative position relationship between the two contact positions. Therefore, the user can rotate (change the direction) the extracted object by performing the rotation operation.

Thereafter, in a case where the user performs a pinch-out operation, as an output action according to the transition to the pinch-out operation, the output action unit 80 displays the object region OB1B with the changed direction at a position at which the pinch-out operation is performed.

Figure 16:
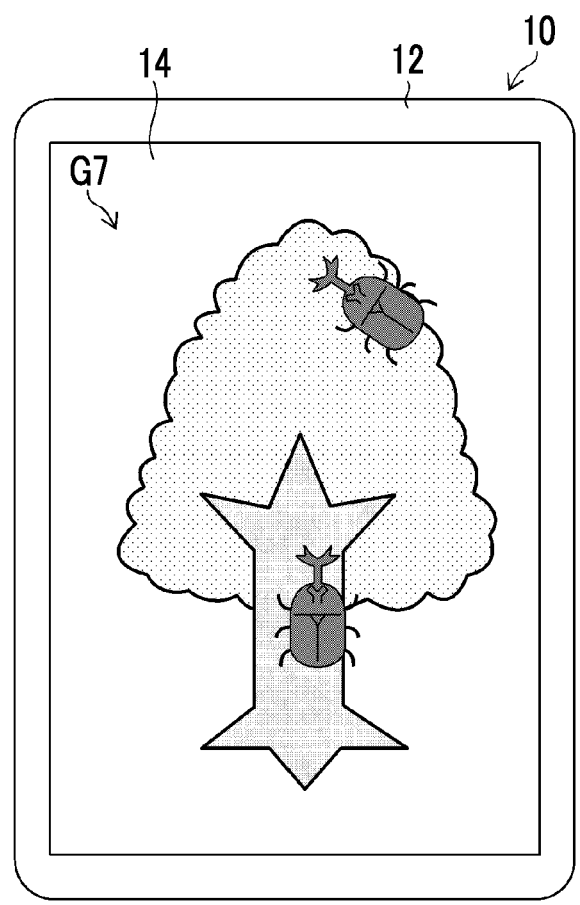
FIG. 16 is a diagram illustrating an image displayed on the touch panel display at a timing when a series of operations is completed.

FIG. 16 is a diagram illustrating an image G7 displayed on the touch panel display 14 at a timing when a series of operations is completed. The image G7 is an image in which the insect with the changed direction is copied and added as compared with the image G1 illustrated in FIG. 7.

In the present embodiment, the user performs a pinch-in operation and then makes the fingers transition to a drag operation, a rotation operation, and a pinch-out operation in this order. On the other hand, in a case where the user makes the fingers transition to a rotation operation, a drag operation, and a pinch-out operation in this order, the same result can be obtained. Further, the drag operation and the pinch-out operation are not necessarily required for the rotation operation. For example, the user may determine an object region by performing a pinch-in operation, change a direction of the determined object region at the original position by performing a rotation operation, and dispose the object region with the changed direction at the original position by making the fingers transition to a non-contact state.

[Enlargement/Reduction]

Figure 17:
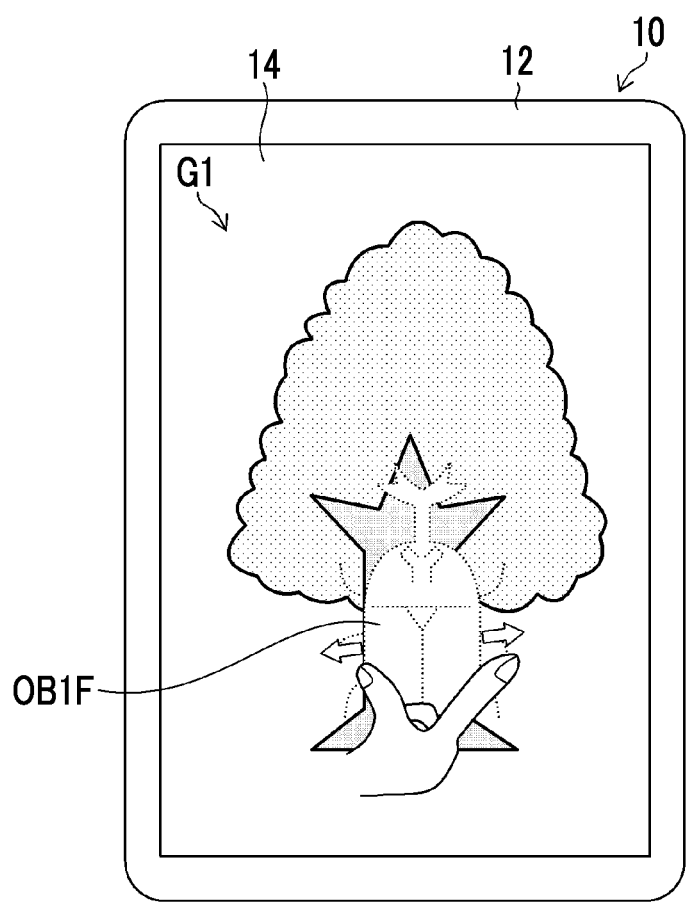
FIG. 17 is a diagram for explaining enlargement of an object.

The tablet PC 10 can also perform enlargement or reduction of a desired object. FIG. 17 is a diagram for explaining enlargement of an object.

In a case where the user performs a pinch-in operation on the image G1 illustrated in FIG. 7 and then makes the fingers transition to a pinch-out operation while maintaining the contact state between the fingers and the touch panel display 14, as illustrated in FIG. 17, as an output action according to the transition to the pinch-out operation, the output action unit 80 disposes an object region OB1F obtained by enlarging the extracted object region OB1A, on the touch panel display 14.

In this case, the pinch-out operation is assigned to an output action for enlargement, and thus an output action for disposing is performed by the non-contact operation. Here, the assignment between the operation and the action is not limited thereto.

An enlargement ratio may be changed according to a size of the contact region in the pinch-out operation (a distance between the start points and the end points of the pinch-in operation).

Figure 18:
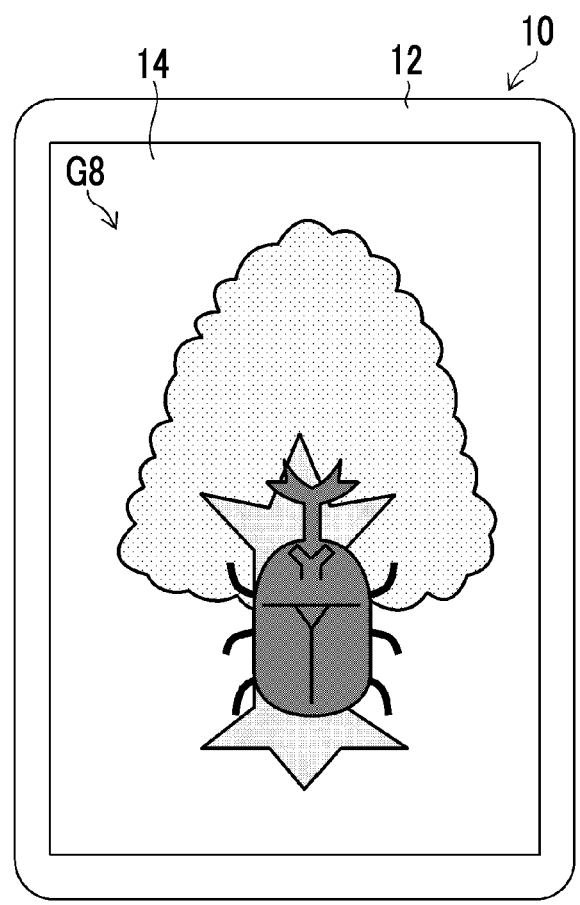
FIG. 18 is a diagram illustrating an image displayed on the touch panel display at a timing when a series of operations is completed.

FIG. 18 is a diagram illustrating an image G8 displayed on the touch panel display 14 at a timing when a series of operations is completed. The image G8 is an image in which the insect is enlarged as compared with the image G1 illustrated in FIG. 7. In this way, the user can change a size of a desired object.

Further, in a case of reduction of a size of an object, a pushing operation is performed. That is, in a case where the user performs a pinch-in operation on an image displayed on the touch panel display 14 and then makes the fingers transition to a pushing operation while maintaining the contact state between the fingers and the touch panel display 14 in the pinch-in state, as an output action according to the transition to the pushing operation, the output action unit 80 displays an object region obtained by reducing the extracted object region, on the touch panel display 14.

In this case, a reduction rate may be changed according to the number of times of pushing or a pushing time.

[Saving]

The tablet PC 10 can also save a desired object in the non-volatile memory 36.

For example, in a case where the user performs a pinch-in operation and then makes the fingers transition to a non-contact operation, an image of the extracted object region is saved. The operation for saving is not limited to the non-contact operation, and may be a pinch-out operation, a pushing operation, or the like.

Further, by a combination with the above example, such as "extraction→rotation→saving" or "extraction→enlargement→saving", an image obtained by editing the extracted object region may be saved.

The image of the object region saved in the non-volatile memory 36 may be appropriately read and displayed on the touch panel display 14.

<Others>

The assignment between "an operation other than a pinch-in action" and "an action related to an object region" is not limited to the above example, and may be appropriately determined. The point is that an object can be specified by a simple operation of the user, which is a single pinch-in operation.

In the embodiment, an example in which a tablet computer terminal is used as a device with a touch panel display has been described. On the other hand, a mobile communication terminal such as a smartphone, a mobile phone, or a personal handyphone system (PHS), a laptop personal computer, or the like may be applied.

The control method of a device with a touch panel display may be realized as a program for causing a computer to execute each step, and may be realized as a non-transitory recording medium storing the program, such as a compact disk-read only memory (CD-ROM).

In the embodiment described above, a hardware structure of the processing unit that executes various processing of the touch panel display control unit 60 is realized by the following various processors. The various processors include a central processing unit (CPU) which is a general-purpose processor that functions as various processing units by executing software (program), a graphics processing unit (GPU) which is a processor specialized for image processing, a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors of the same type or different types (for example, a combination of a plurality of FPGAs, a combination of a CPU and an FPGA, or a combination of a CPU and a GPU). Further, the plurality of processing units may be configured by one processor. As an example in which the plurality of processing units are configured by one processor, firstly, as represented by a computer such as a server and a client, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

The technical scope of the present invention is not limited to the scope described in the above embodiment. The configurations and the like in each embodiment can be appropriately combined with each other without departing from the spirit of the present invention.

EXPLANATION OF REFERENCES

10: tablet computer terminal (tablet PC)
12: housing
14: touch panel display
14A: display unit
14B: touch panel unit
14C: pressing force sensor
16: operation button
18: speaker
20: built-in camera
20A: imaging lens
20B: imaging element
24: external connection terminal
32: system bus
34: main memory
36: non-volatile memory
38: mobile communication unit
38A: antenna
40: wireless LAN communication unit
40A: antenna
42: short-range wireless communication unit
42A: antenna
44: wired communication unit
50: key input unit
52: voice processing unit
54: imaging control unit
60: touch panel display control unit
62: display control unit
64: image display unit
68: input recognition unit
70: pinch-in operation recognition unit
72: contact region recognition unit
74: operation transition recognition unit
76: image processing unit
78: object region determination unit
80: output action unit
S1 to S6: each step in control method of tablet PC

What is claimed is:

1. A device with a touch panel display comprising:
a touch panel display;
an image display configured to cause the touch panel display to display an image; and
a processor communicatively coupled to a non-transitory memory, the processor being configured to execute steps of:
recognizing a pinch-in operation of a user on the touch panel display;
recognizing a contact region in which a finger is brought into contact with the touch panel display by the pinch-in operation;
extracting a plurality of object regions from the image by performing segmentation processing on a region including the recognized contact region in the image in response to the pinch-in operation;
determining one of the extracted object regions as a determined object region, the one of the extracted object regions being occupied by an object including at least a portion of the recognized contact region on the image;
recognizing a transition from the pinch-in operation to an operation other than the pinch-in operation; and
performing an action related to the determined object region on the image displayed on the touch panel display in a case where the transition to the operation other than the pinch-in operation is recognized, wherein
in the image, at least a region of a first object is included in a region of a second object, and
in a case where at least a portion of the contact region is included in the region of the first object in the region of the second object, the processor determines the region of the first object as the determined object region.

2. The device according to claim 1, wherein
the operation other than the pinch-in operation is a pinch-out operation.

3. The device according to claim 1, wherein
the operation other than the pinch-in operation is an operation of releasing a contact with the touch panel display.

4. The device according to claim 1, wherein
the operation other than the pinch-in operation is a drag operation.

5. The device according to claim 1, wherein
the operation other than the pinch-in operation is an operation of making a pressing force against the touch panel display stronger than the pressing force in the pinch-in operation.

6. The device according to claim 1, wherein
the action related to the object region is an action of copying or moving the object region.

7. The device according to claim 1, wherein
the action related to the object region is an action of storing the object region in a memory.

8. The device according to claim 1, wherein
the action related to the object region is an action of changing a direction of the object region.

9. The device according to claim 1, wherein
the action related to the object region is an action of enlarging or reducing the object region.

10. The device according to claim 1, wherein
the image is a captured image obtained by an imaging element.

11. The device according to claim 1, wherein
the first object is an object disposed on the second object.

12. The device according to claim 1, wherein,
in a case where the contact region is included only in the region of the second object, the processor determines a combination of the regions of the first object and the second object, as the determined object region.

13. A control method of a device with a touch panel display, the method comprising:
causing the touch panel display to display an image;
recognizing a pinch-in operation of a user on the touch panel display;
recognizing a contact region in which a finger is brought into contact with the touch panel display by the pinch-in operation;
extracting a plurality of object regions from the image by performing segmentation processing on a region including the recognized contact region in the image in response to the pinch in operation;
determining one of the extracted object regions as a determined object region, the one of the extracted object regions being occupied by an object including at least a portion of the recognized contact region on the image;
recognizing a transition from the pinch-in operation to an operation other than the pinch-in operation; and
performing an action related to the determined object region on the image displayed on the touch panel display in a case where the transition to the operation other than the pinch-in operation is recognized, wherein
in the image, at least a region of a first object is included in a region of a second object, and
in a case where at least a portion of the contact region is included in the region of the first object in the region of the second object, the region of the first object is determined as the determined object region.

14. A non-transitory computer readable recording medium that causes a computer to execute the control method of a device with a touch panel display according to claim 13, in a case where a command stored in the recording medium is read by the computer.

* * * * *